(12) United States Patent
Hayes et al.

(10) Patent No.: US 11,364,797 B1
(45) Date of Patent: Jun. 21, 2022

(54) MULTI-SPEED AXLE ASSEMBLY HAVING A ONE-WAY FREEWHEEL CLUTCH

(71) Applicant: ArvinMeritor Technology, LLC, Troy, MI (US)

(72) Inventors: Brian D. Hayes, Troy, MI (US); Robert Martin, Troy, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 0 days.

(21) Appl. No.: 17/342,818

(22) Filed: Jun. 9, 2021

(51) Int. Cl.
| | |
|---|---|
| *B60K 17/26* | (2006.01) |
| *F16D 41/12* | (2006.01) |
| *F16H 48/06* | (2006.01) |
| *B60K 17/16* | (2006.01) |
| *F16H 37/08* | (2006.01) |
| *B60K 7/00* | (2006.01) |
| *B60K 1/00* | (2006.01) |

(52) U.S. Cl.
CPC .............. *B60K 17/26* (2013.01); *B60K 17/16* (2013.01); *F16D 41/12* (2013.01); *F16H 37/082* (2013.01); *F16H 48/06* (2013.01); *B60K 2001/001* (2013.01); *B60K 2007/0069* (2013.01)

(58) Field of Classification Search
CPC ......... B60K 17/26; B60K 17/16; F16D 41/12; F16H 37/082; F16H 48/06
See application file for complete search history.

(56) References Cited

U.S. PATENT DOCUMENTS

| | | | | |
|---|---|---|---|---|
| 5,427,196 | A * | 6/1995 | Yamaguchi | B60K 17/08 475/204 |
| 8,617,018 | B2 * | 12/2013 | Wahl | F16H 61/0028 475/8 |
| 8,790,202 | B2 * | 7/2014 | Sakai | B60W 10/10 475/5 |
| 9,062,744 | B2 * | 6/2015 | Valente | F16H 3/44 |
| 9,381,800 | B2 * | 7/2016 | Sakai | B60L 7/14 |
| 9,625,021 | B2 * | 4/2017 | Knoblauch | B60K 7/0007 |
| 9,777,818 | B2 * | 10/2017 | Valente | F16H 3/54 |
| 10,732,155 | B2 * | 8/2020 | Valente | G01N 30/74 |
| 2015/0226297 | A1 * | 8/2015 | Knoblauch | F16H 37/0833 475/150 |
| 2018/0010668 | A1 * | 1/2018 | Hirano | F16H 57/08 |
| 2019/0054816 | A1 | 2/2019 | Garcia et al. | |
| 2019/0054817 | A1 | 2/2019 | Garcia et al. | |
| 2019/0054818 | A1 | 2/2019 | Garcia et al. | |
| 2020/0173494 | A1 | 6/2020 | Smith et al. | |

(Continued)

FOREIGN PATENT DOCUMENTS

| | | | | |
|---|---|---|---|---|
| DE | 102018203458 | A1 * | 9/2019 | ............... B60K 1/00 |
| DE | 102018128780 | A1 * | 5/2020 | ............... F16H 3/54 |

OTHER PUBLICATIONS

Kurth (DE 102018128780 A1, May 20, 2020, machine translation); (Year: 2020).*

(Continued)

*Primary Examiner* — Tinh Dang
(74) *Attorney, Agent, or Firm* — Brooks Kushman PC

(57) ABSTRACT

An axle assembly having an electric motor module, a drive pinion, a planetary gear set, and at least one one-way freewheel clutch. The planetary gear set may operatively connect the electric motor module and the drive pinion. The one-way freewheel clutch may be configured to selectively couple at least two components of the planetary gear set.

20 Claims, 13 Drawing Sheets

(56) References Cited

U.S. PATENT DOCUMENTS

| | | |
|---|---|---|
| 2020/0173531 A1 | 6/2020 | Smith |
| 2020/0173535 A1 | 6/2020 | Peng et al. |
| 2020/0173537 A1 | 6/2020 | Begov et al. |
| 2020/0173541 A1 | 6/2020 | Soffner et al. |
| 2020/0177049 A1 | 6/2020 | Raya et al. |
| 2020/0177059 A1 | 6/2020 | Smith et al. |
| 2021/0231199 A1* | 7/2021 | Schlittenbauer ....... B60K 17/08 |

OTHER PUBLICATIONS

Scholle (DE 102018203458 A1, Sep. 12, 2019, machine translation); (Year: 2019).*

Hayes, et al., U.S. Appl. No. 16/827,102, filed Mar. 23, 2020, 44 pages.

* cited by examiner

MULTI-SPEED AXLE ASSEMBLY HAVING A ONE-WAY FREEWHEEL CLUTCH

TECHNICAL FIELD

This relates to a multi-speed axle assembly for a vehicle that may have at least one one-way freewheel clutch.

BACKGROUND

A drive axle system having a one-way freewheel clutch is disclosed in U.S. patent application Ser. No. 16/827,102.

SUMMARY

In at least one embodiment an axle assembly is provided. The axle assembly includes an electric motor module, a drive pinion, a planetary gear set, and a one-way freewheel clutch. The electric motor module has a rotor that is rotatable about an axis. The drive pinion is rotatable about the axis. The planetary gear set operatively connects the rotor to the drive pinion. The planetary gear set includes a planet gear carrier, a sun gear, a planetary ring gear, and a set of planet gears. The planet gear carrier is rotatable about the axis and is operatively connected to the rotor. The sun gear is rotatable about the axis and is operatively connected to the drive pinion. The planetary ring gear encircles the sun gear and is rotatable about the axis. The set of planet gears is rotatably supported upon the planet gear carrier. Each member of the set of planet gears meshes with the sun gear and the planetary ring gear. The one-way freewheel clutch may be configured to selectively couple at least two components of the planetary gear set. For instance, the one-way freewheel clutch may be rotatably disposed on the planet gear carrier or may extend between the sun gear and the planet gear carrier.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
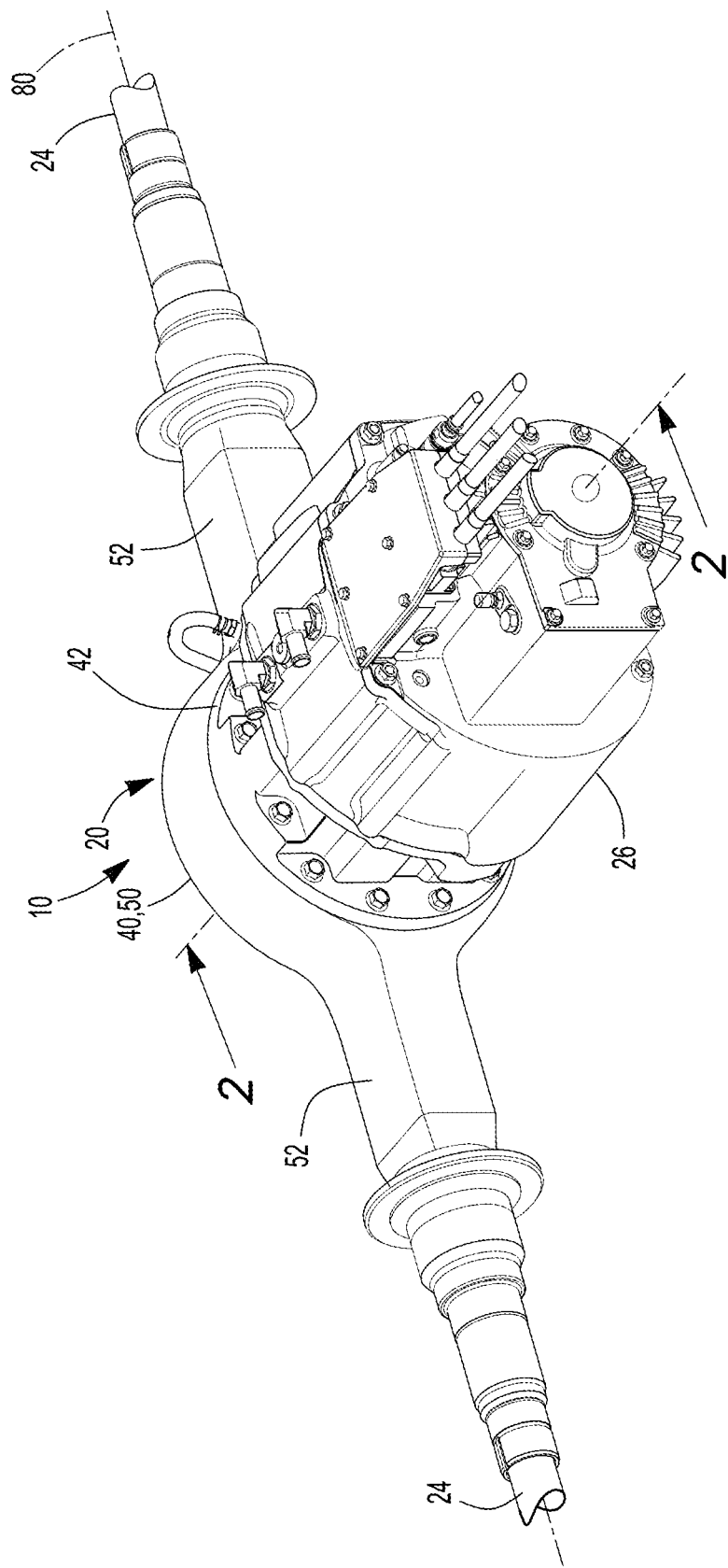
FIG. 1 is a perspective view of an example of an axle assembly.

Referring to FIG. 1, an example of an axle assembly 10 is shown. The axle assembly 10 may be provided with a vehicle like a truck, bus, farm equipment, mining equipment, military transport or weaponry vehicle, or cargo loading equipment for land, air, or marine vessels. The vehicle may include a trailer for transporting cargo in one or more embodiments.

The axle assembly 10 may provide torque to one or more traction wheel assemblies that may include a tire mounted on a wheel. The wheel may be mounted to a wheel hub that may be rotatable about a wheel axis.

Figure 2:
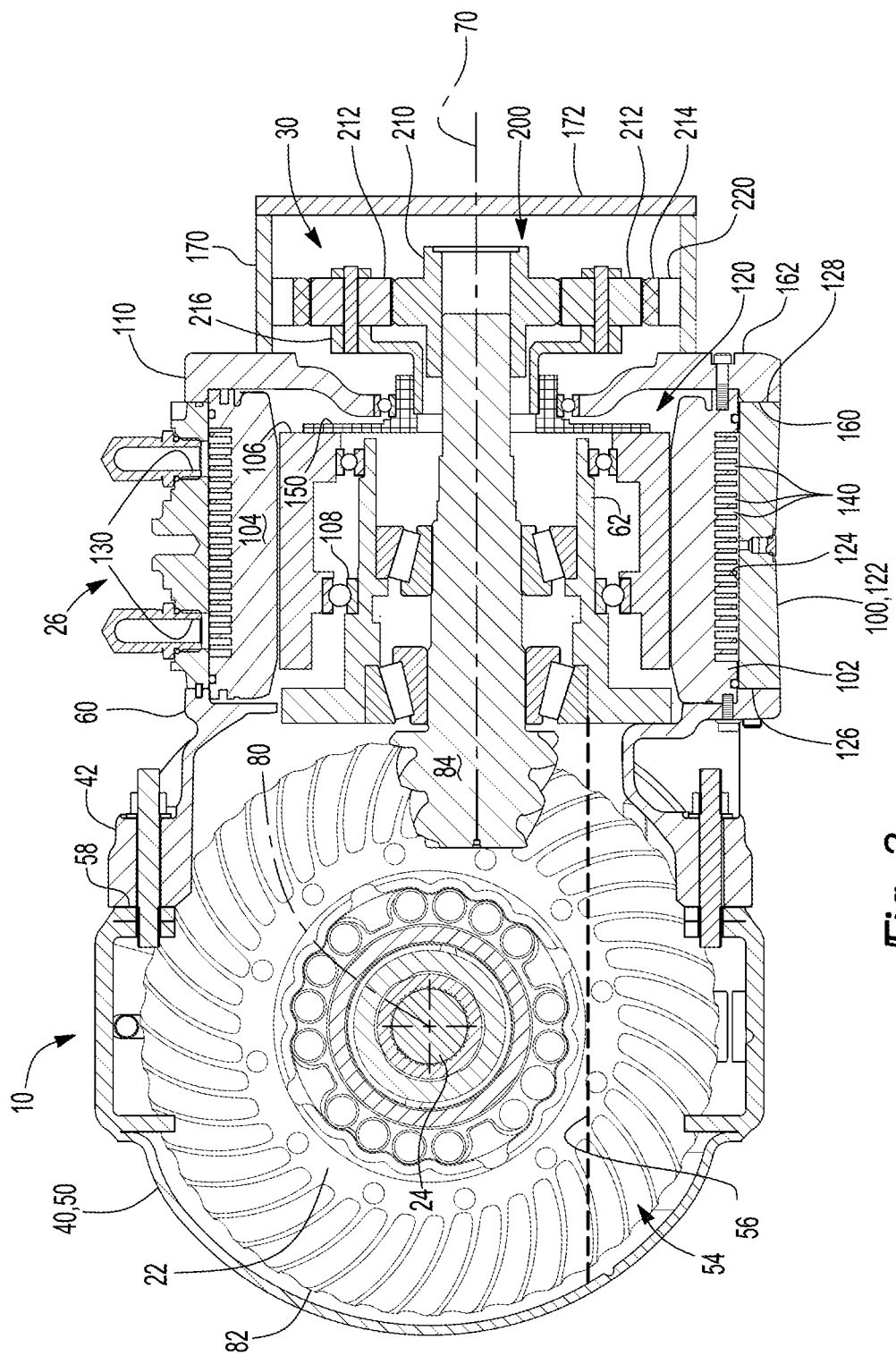
FIG. 2 is a section view of the axle assembly along section line 2-2

One or more axle assemblies may be provided with the vehicle. As is best shown with reference to FIGS. 1 and 2, the axle assembly 10 may include a housing assembly 20, a differential assembly 22, at least one axle shaft 24, and an electric motor module 26. As is best shown in FIG. 2, the axle assembly 10 may include a gear reduction module 30.

Housing Assembly

Referring to FIG. 1, the housing assembly 20 may receive various components of the axle assembly 10. In addition, the housing assembly 20 may facilitate mounting of the axle assembly 10 to the vehicle. In at least one configuration, the housing assembly 20 may include an axle housing 40 and a differential carrier 42.

The axle housing 40 may receive and may support the axle shafts 24. In at least one configuration, the axle housing 40 may include a center portion 50 and at least one arm portion 52.

The center portion 50 may be disposed proximate the center of the axle housing 40. The center portion 50 may define a cavity that may at least partially receive the differential assembly 22. As is best shown in FIG. 2, a lower region of the center portion 50 may at least partially define a sump portion 54 that may contain or collect lubricant 56. Lubricant 56 in the sump portion 54 may be splashed by a ring gear of the differential assembly 22 and distributed to lubricate various components.

Referring to FIG. 2, the center portion 50 may include a carrier mounting surface 58. The carrier mounting surface 58 may facilitate mounting of the differential carrier 42 to the axle housing 40. For example, the carrier mounting surface 58 may face toward and may engage the differential carrier 42 and may have a set of holes that may be aligned with corresponding holes on the differential carrier 42. Each hole may receive a fastener, such as a bolt or stud, that may couple the differential carrier 42 to the axle housing 40.

Referring to FIG. 1, one or more arm portions 52 may extend from the center portion 50. For example, two arm portions 52 may extend in opposite directions from the center portion 50 and away from the differential assembly 22. The arm portions 52 may have substantially similar configurations. For example, the arm portions 52 may each have a hollow configuration or tubular configuration that may extend around and may receive a corresponding axle shaft 24 and may help separate or isolate the axle shaft 24 or a portion thereof from the surrounding environment. An arm portion 52 or a portion thereof may or may not be integrally formed with the center portion 50. It is also contemplated that the arm portions 52 may be omitted.

Referring to FIGS. 1 and 2, the differential carrier 42 may be mounted to the center portion 50 of the axle housing 40. The differential carrier 42 may support the differential assembly 22 and may facilitate mounting of the electric motor module 26. For example, the differential carrier may include one or more bearing supports that may support a bearing like a roller bearing assembly that may rotatably support the differential assembly 22. The differential carrier 42 may also include a mounting flange 60 and a bearing support wall 62.

Referring to FIG. 2, the mounting flange 60 may facilitate mounting of the electric motor module 26. As an example, the mounting flange 60 may be configured as a ring that may extend outward and away from an axis 70 and may extend around the axis 70. In at least one configuration, the mounting flange 60 may include a set of fastener holes that may be configured to receive fasteners that may secure the electric motor module 26 to the mounting flange 60.

The bearing support wall 62 may support bearings that may rotatably support other components of the axle assembly 10. For example, the bearing support wall 62 may support bearings that may rotatably support a drive pinion 84, bearings that may rotatably support a rotor of the electric motor module 26, or both. The bearing support wall 62 may extend in an axial direction away from the axle housing 40 and may extend around the axis 70. The bearing support wall 62 may define a hole that may extend along or around the axis 70 and receive the drive pinion 84 and the bearings that rotatably support the drive pinion 84. The bearing support wall 62 may be integrally formed with the differential carrier 42 or may be a separate component that is secured to or fastened to the differential carrier 42.

Differential Assembly, Drive Pinion, and Axle Shafts

Referring to FIG. 2, the differential assembly 22 may be at least partially received in the center portion 50 of the housing assembly 20. The differential assembly 22 may be rotatable about a differential axis 80 and may transmit torque to the axle shafts 24 and wheels. The differential assembly 22 may be operatively connected to the axle shafts 24 and may permit the axle shafts 24 to rotate at different rotational speeds in a manner known by those skilled in the art. The differential assembly 22 may have a ring gear 82 that may have teeth that mate or mesh with the teeth of a gear portion of the drive pinion 84. Accordingly, the differential assembly 22 may receive torque from the drive pinion 84 via the ring gear 82 and transmit torque to the axle shafts 24.

The drive pinion 84 may provide torque to the ring gear 82. In an axle assembly that includes a gear reduction module 30, the drive pinion 84 may operatively connect the gear reduction module 30 to the differential assembly 22. In at least one configuration, the drive pinion 84 may be rotatable about the axis 70 and may be rotatably supported inside another component, such as the bearing support wall 62.

Referring to FIG. 1, the axle shafts 24 may transmit torque from the differential assembly 22 to corresponding wheel hubs and wheels. Two axle shafts 24 may be provided such that each axle shaft 24 extends through a different arm portion 52 of axle housing 40. The axle shafts 24 may extend along and may be rotatable about an axis, such as the differential axis 80. Each axle shaft 24 may have a first end and a second end. The first end may be operatively connected to the differential assembly 22. The second end may be disposed opposite the first end and may be operatively connected to a wheel. Optionally, gear reduction may be provided between an axle shaft 24 and a wheel.

Electric Motor Module

Referring to FIG. 2, the electric motor module 26, which may also be referred to as an electric motor, may be mounted to the differential carrier 42 and may be operatively connectable to the differential assembly 22. For instance, the electric motor module 26 may provide torque to the differential assembly 22 via the drive pinion 84 and the gear reduction module 30 as will be discussed in more detail below. The electric motor module 26 may be mostly or completely disposed outside the differential carrier 42. In addition, the electric motor module 26 may be axially positioned between the axle housing 40 and the gear reduction module 30. In at least one configuration, the electric motor module 26 may include a motor housing 100, a coolant jacket 102, a stator 104, a rotor 106, at least one rotor bearing assembly 108, and a cover 110.

The motor housing 100 may extend between the differential carrier 42 and the cover 110. The motor housing 100 may be mounted to the differential carrier 42 and the cover 110. For example, the motor housing 100 may extend from the mounting flange 60 of the differential carrier 42 to the cover 110. The motor housing 100 may extend around the axis 70 and may define a motor housing cavity 120. The motor housing cavity 120 may be disposed inside the motor housing 100 and may have a generally cylindrical configuration. The bearing support wall 62 of the differential carrier 42 may be located inside the motor housing cavity 120. Moreover, the motor housing 100 may extend continuously around and may be spaced apart from the bearing support wall 62. In at least one configuration, the motor housing 100 may have an exterior side 122, an interior side 124, a first end surface 126, a second end surface 128, and one or more ports 130.

The exterior side 122 may face away from the axis 70 and may define an exterior or outside surface of the motor housing 100.

The interior side 124 may be disposed opposite the exterior side 122. The interior side 124 may be disposed at a substantially constant radial distance from the axis 70 in one or more configurations.

The first end surface 126 may extend between the exterior side 122 and the interior side 124. The first end surface 126 may be disposed at an end of the motor housing 100 that may face toward the differential carrier 42. For instance, the first end surface 126 may be disposed adjacent to the mounting flange 60 of the differential carrier 42. The motor housing 100 and the first end surface 126 may or may not be received inside the mounting flange 60.

The second end surface 128 may be disposed opposite the first end surface 126. As such, the second end surface 128 may be disposed at an end of the motor housing 100 that may face toward and may engage the cover 110. The second end surface 128 may extend between the exterior side 122 and the interior side 124 and may or may not be received inside the cover 110.

One or more ports 130 may extend through the motor housing 100. The ports 130 may be configured as through holes that may extend from the exterior side 122 to the interior side 124. The ports 130 may allow coolant, such as a fluid like water, a water/antifreeze mixture, or the like, to flow to and from the coolant jacket 102 as will be described in more detail below.

The coolant jacket 102 may help cool or remove heat from the stator 104. The coolant jacket 102 may be received in the motor housing cavity 120 of the motor housing 100 and may engage the interior side 124 of the motor housing 100. The coolant jacket 102 may extend axially between the differential carrier 42 and the cover 110. For example, the coolant jacket 102 may extend axially from the differential carrier 42, the cover 110, or both. In addition, the coolant jacket 102 may extend around the axis 70 and the stator 104. As such, the stator 104 may be at least partially received in and may be encircled by the coolant jacket 102. Moreover, the coolant jacket 102 may extend in a radial direction from the stator 104 to the interior side 124 of the motor housing 100. In at least one configuration, the coolant jacket 102 may include a plurality of channels 140.

The channels 140 may at least partially extend around the axis 70 and may be disposed opposite the stator 104. The channels 140 may be configured with an open side that may face away from the axis 70 and toward the interior side 124 of the motor housing 100. Coolant may be provided to the coolant jacket 102 via a first port 130 and may exit the coolant jacket 102 via a second port 130. For instance, coolant may flow from the first port 130 into the channels 140, receive heat from the stator 104 as the coolant flows through the channels 140, and exit at the second port 130. One or more baffles may be provided with the coolant jacket 102 that may reverse or change the direction of coolant flow to help route coolant from the first port 130 to the second port 130.

The stator 104 may be received in the motor housing 100. For instance, the stator 104 may be received in the motor housing cavity 120. The stator 104 may be fixedly positioned with respect to the coolant jacket 102. For example, the stator 104 may extend around the axis 70 and may include stator windings that may be received inside and may be fixedly positioned with respect to the coolant jacket 102.

The rotor 106 may extend around and may be rotatable about the axis 70. The rotor 106 may be received inside the stator 104, the coolant jacket 102, and the motor housing cavity 120 of the motor housing 100. The rotor 106 may be rotatable about the axis 70 with respect to the differential carrier 42 and the stator 104. In addition, the rotor 106 may be spaced apart from the stator 104 but may be disposed in close proximity to the stator 104. The rotor 106 may include magnets or ferromagnetic material that may facilitate the generation of electrical current or may be induction-based. The rotor 106 may extend around and may be supported by the bearing support wall 62.

One or more rotor bearing assemblies 108 may rotatably support the rotor 106. For example, a rotor bearing assembly 108 may receive the bearing support wall 62 of the differential carrier 42 and may be received inside of the rotor 106. The rotor 106 may be operatively connected to the drive pinion 84. For instance, a coupling such as a rotor output flange 150 may operatively connect the rotor 106 to the gear reduction module 30, which in turn may be operatively connectable with the drive pinion 84.

The cover 110 may be mounted to the motor housing 100 and may be disposed opposite the axle housing 40 and the differential carrier 42. For example, the cover 110 may be mounted to an end or end surface of the motor housing 100, such as the second end surface 128, that may be disposed opposite the differential carrier 42. As such, the cover 110 may be spaced apart from and may not engage the differential carrier 42. The cover 110 may be provided in various configurations. In at least one configuration, the cover 110 may include a first side 160 and a second side 162. The first side 160 may face toward and may engage the motor housing 100. The second side 162 may be disposed opposite the first side 160. The second side 162 may face away from the motor housing 100 and may be disposed opposite the motor housing 100. The cover 110 may also include or define a motor cover opening that may be a through hole through which the drive pinion 84 may extend.

Gear Reduction Module and Clutches

Referring to FIG. 2, an example of a gear reduction module 30 is shown. The gear reduction module 30 may transmit torque between the electric motor module 26 and the differential assembly 22. As such, the gear reduction module 30 may help operatively connect the electric motor module 26 and the differential assembly 22.

The gear reduction module 30 may be disposed outside of the differential carrier 42 and may be partially or completely disposed outside of the electric motor module 26. For instance, the gear reduction module 30 may include a gear reduction module housing 170 that may receive gears of the gear reduction module 30. The gear reduction module housing 170 may be provided in various configurations. For example, the gear reduction module housing 170 may be a separate component that is mounted to the cover 110 or may be integrally formed with the cover 110. The gear reduction module housing 170 may extend from the second side 162 of the cover 110 in a direction that extends away from the electric motor module 26. A gear reduction module cover 172 may be disposed on the gear reduction module housing 170 and may be removable to provide access to components located inside the gear reduction module housing 170.

The gear reduction module 30 may be provided in various configurations. In each configuration, the gear reduction module 30 may have an epicyclic or planetary gear set 200 that may operatively connect the rotor 106 to the drive pinion 84. In addition, the planetary gear set 200 may include a sun gear 210, a set of planet gears 212, a planetary ring gear 214, and a planet gear carrier 216. A planetary ring gear clutch 220 may be associated with the planetary gear set 200. Also as is best shown in FIGS. 3-8 and 13-16, at least one one-way freewheel clutch 222, 222', 222" may be associated with the planetary gear set 200.

Figure 3:
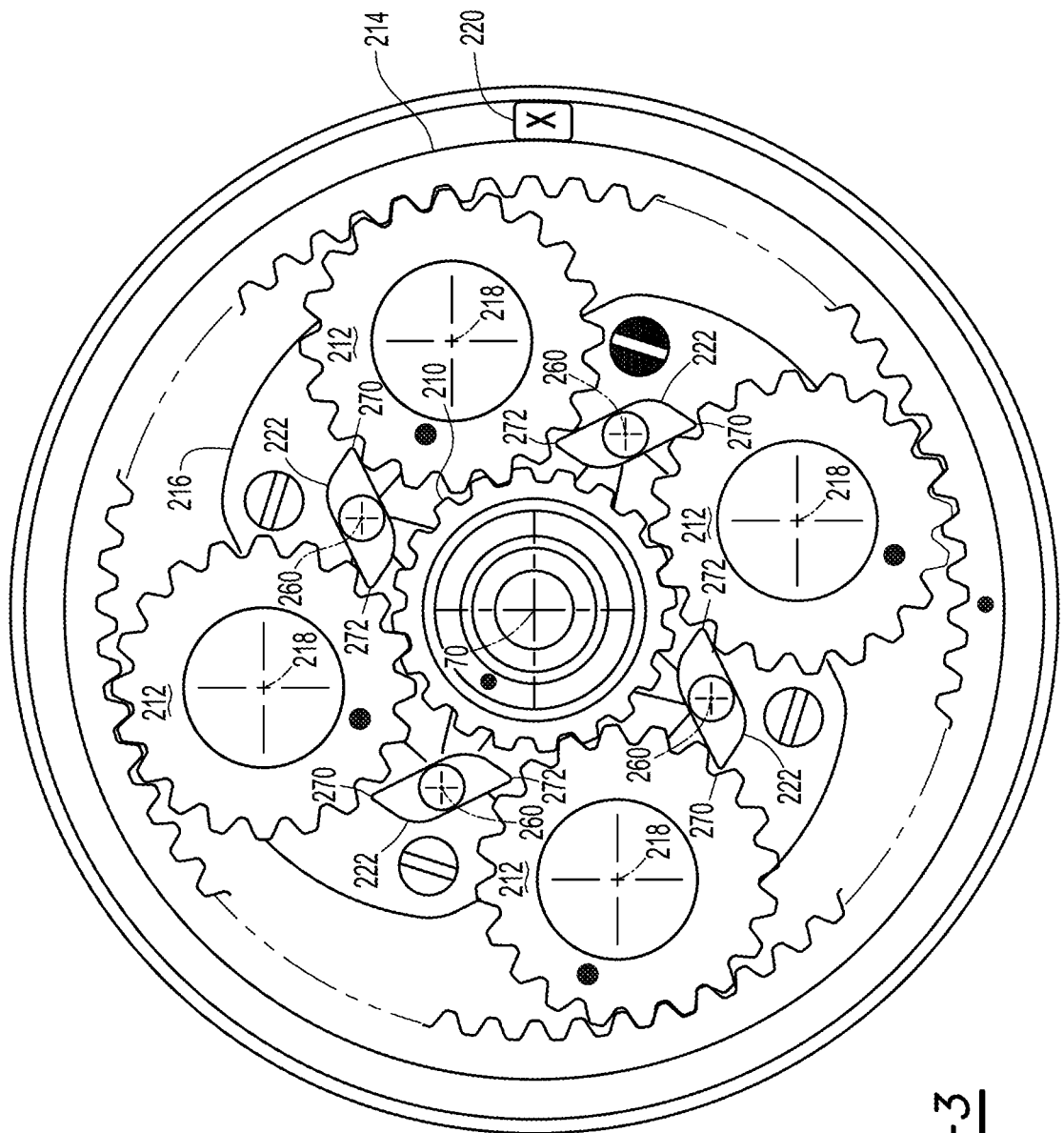
FIGS. 3 and 4 show a sequence of positions that depict a planetary gear set with one-way freewheel clutches decoupled from the planet gears.

Referring primarily to FIGS. 2 and 3, the sun gear 210 may be disposed proximate the center of the planetary gear set 200. The sun gear 210 may be rotatable about the axis 70 with the drive pinion 84. For instance, the sun gear 210 may encircle the drive pinion 84 and may be coupled to the drive pinion 84 in any suitable manner, such as with mating splines.

The set of planet gears 212 may be arranged around the sun gear 210. One or more planet gears 212 may be provided. Each planet gear 212 may have teeth that may mesh with teeth of the sun gear 210 that extend away from the axis 70 and mesh with teeth of the planetary ring gear 214 that extend toward the axis 70. The planet gears 212 may be rotatably supported upon the planet gear carrier 216. For instance, each planet gear 212 or each member of the set of planet gears may encircle a corresponding planet pin that may extend from the planet gear carrier 216 and may be rotatable about a corresponding planet gear axis 218 with respect to the planet gear carrier 216. The planet gear axes 218 may be positioned at a constant or substantially constant radial distance from the axis 70.

The planetary ring gear 214 may extend around the axis 70 and may receive the set of planet gears 212. As such, the planetary ring gear 214 may encircle the sun gear 210 and the set of planet gears 212. The planetary ring gear 214 may be rotatable about the axis 70 with respect to the gear reduction module housing 170. The planetary ring gear 214 may have teeth that extend toward the axis 70 and that may be arranged in a repeating pattern around the axis 70. Some of these teeth are omitted in FIGS. 3-10 for clarity.

The planet gear carrier 216 may help rotatably support the set of planet gears 212. In addition, the planet gear carrier 216 may be rotatable about the axis 70. The planet gear carrier 216 may extend toward and may be operatively connected to the rotor 106. For instance, the planet gear carrier 216 may be directly coupled to the rotor 106 or indirectly coupled to the rotor 106, such as via the rotor output flange 150.

The planetary ring gear clutch 220 may control rotation of the planetary ring gear about the axis 70. In FIGS. 3-8 and 13-16, the planetary ring gear clutch 220 is represented by a box that extends between the planetary ring gear 214 and a stationary or grounding component, such as the gear reduction module housing 170. The box is checked with an X when the planetary ring gear clutch 220 is engaged to couple or ground the planetary ring gear clutch 220. The box is empty and is not checked with an X when the planetary ring gear clutch 220 is at least partially disengaged and the planetary ring gear 214 and grounding component are decoupled, disconnected, or unlocked from each other so as to permit the planetary ring gear 214 to rotate about the axis 70. The square box may represent a single clutch or multiple clutches. The planetary ring gear clutch 220 may be operated or actuated with any suitable type of actuator, such as an electrical actuator, electromechanical actuator, mechanical actuator, pneumatic actuator, hydraulic actuator, or the like.

The planetary ring gear clutch 220 may have any suitable configuration, some examples of which are shown in FIGS. 9-12.

Figure 9:
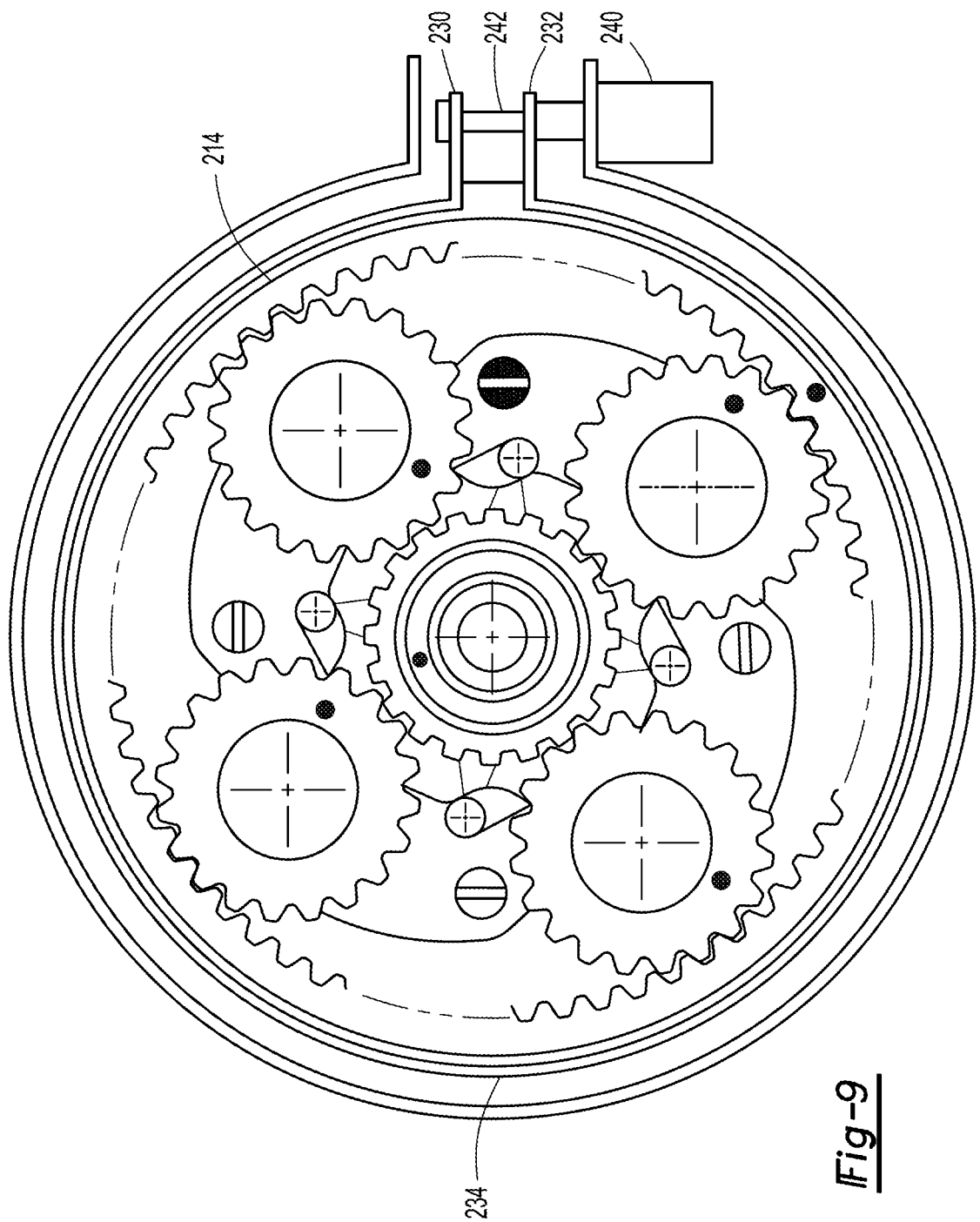
FIGS. 9 and 10 show an example of a planetary ring gear clutch configured as a band clutch in disengaged and engaged positions, respectively.
Figure 10:
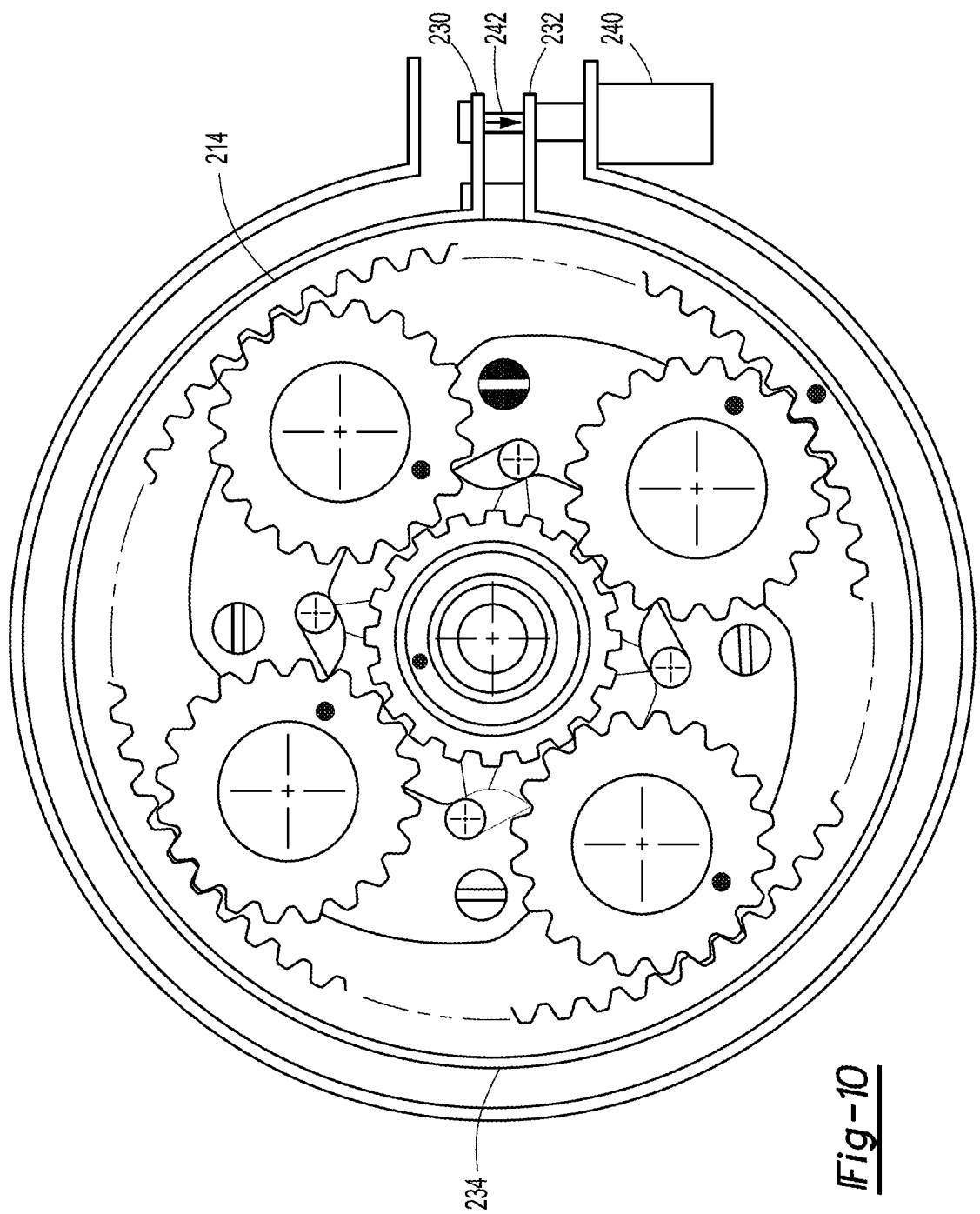

In FIGS. 9 and 10, the planetary ring gear clutch 220 is configured as a band clutch that partially encircles the planetary ring gear 214. In such a configuration, the band clutch may have a first tab 230, a second tab 232, and a band 234. The first tab 230 may extend from a first end of the band clutch to the band 234. The second tab 232 may extend from a second end of the band clutch to an opposite end of the band 234. The band 234 may extend around the axis 70 and the planetary ring gear 214. The first tab 230 and the second tab 232 may be operatively connected to an actuator 240.

In FIG. 9, the planetary ring gear clutch 220 is shown in a disengaged position in which the planetary ring gear clutch 220 is spaced apart from the planetary ring gear 214.

In FIG. 10, the planetary ring gear clutch 220 is shown in an engaged position in which the band 234 engages the planetary ring gear 214 to exert force that may slow or stop rotation of the planetary ring gear 214 about the axis 70. The planetary ring gear clutch 220 may be moved from the disengaged position to the engaged position by compressing the band 234 around the planetary ring gear 214, which may be accomplished by reducing the distance between the first tab 230 and the second tab 232. As an example, the actuator 240 may retract a shaft 242 to move the first tab 230 toward a stationary second tab 232. The force exerted against the planetary ring gear 214 by the planetary ring gear clutch 220 may be reduced by extending the shaft 242.

Figure 12:
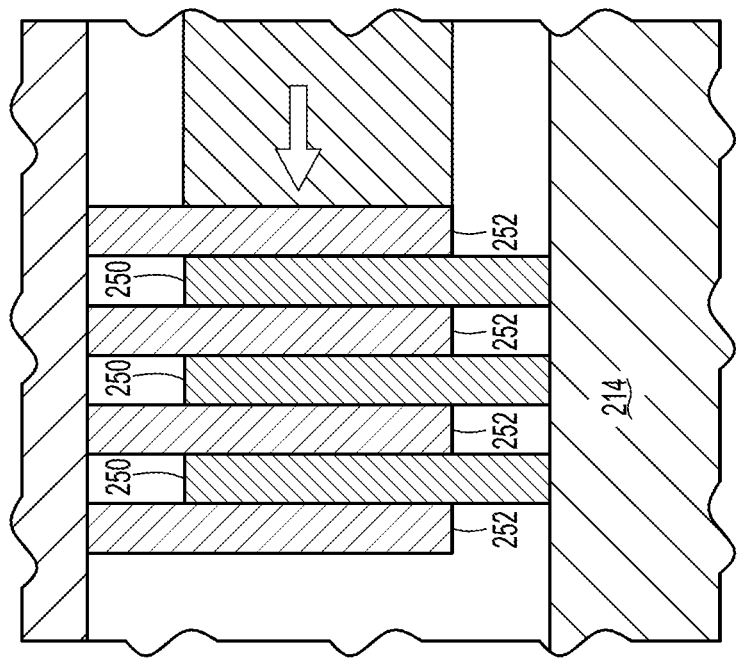
FIGS. 11 and 12 show an example of a planetary ring gear clutch configured as a multi-disc clutch in disengaged and engaged positions, respectively.
Figure 11:
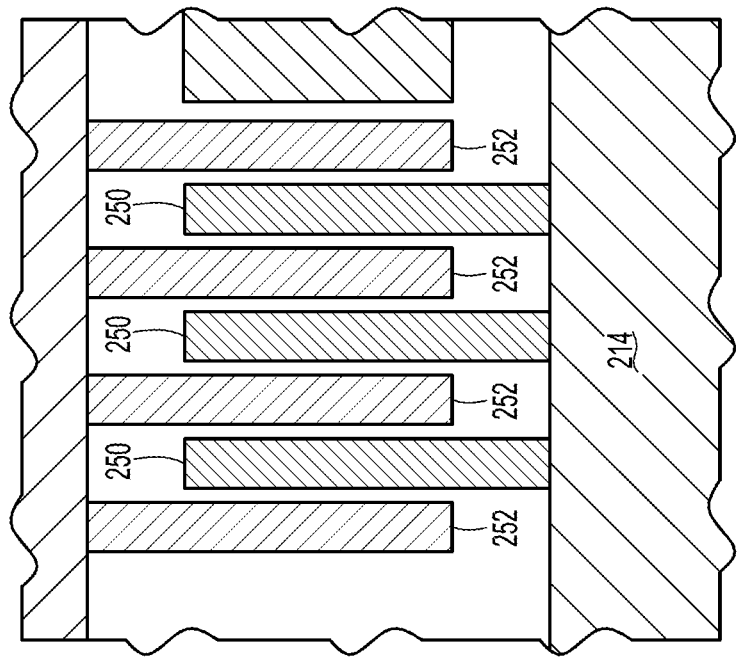

In FIGS. 11 and 12, an example of a planetary ring gear clutch 220 is shown that is configured as a multi-plate clutch that may encircle the planetary ring gear 214 and may be actuatable in a direction that extends along the axis 70. For instance, a multi-plate clutch may include a set of first clutch plates 250 and a set of second clutch plates 252. The first clutch plates 250 may extend away from the axis 70 from the exterior side of the planetary ring gear 214 that faces away from the axis 70 and may be rotationally fixed with respect to the planetary ring gear 214. The second clutch plates 252 may be spaced apart from the planetary ring gear 214 and may extend toward the axis 70 from a mounting plate or other stationary or grounded component such that the second clutch plates 252 are inhibited from rotating about the axis 70. The first and second clutch plates 250, 252 may be arranged in an alternating pattern and may be interleaved with each other.

In FIG. 11, the planetary ring gear clutch 220 is shown in a disengaged position in which the first clutch plates 250 and the second clutch plates 252 are spaced apart from the each other, thereby permitting free rotation of the planetary ring gear 214 and the first clutch plates 250 about the axis 70 with respect to the second clutch plates 252.

In FIG. 12, the planetary ring gear clutch 220 is shown in an engaged position in which the actuator compresses the first and second clutch plates 250, 252 into engagement to exert force that may slow or stop rotation of the planetary ring gear 214 about the axis 70. The compressive force may be controlled to prevent the first clutch plates 250 and the planetary ring gear 214 from rotating with respect to the second clutch plates 252 or to permit limited slip in which the first clutch plates 250 and the planetary ring gear 214 may rotate about the axis 70 with respect to the second clutch plates 252 but at a reduced speed due to the friction exerted between the first and second clutch plates 250, 252.

Referring to FIGS. 3-8 and 13-16, at least one one-way freewheel clutch 222, 222', 222" may be associated with the planetary gear set 200. The one-way freewheel clutch, which may also be called an overrunning clutch, may be of any suitable type, such as a sprag clutch, ratchet clutch, pawl clutch, or the like. The one-way freewheel clutch 222, 222', 222" may selectively couple the one rotatable component of the planetary gear set 200 to another rotatable component of the planetary gear set 200. The one-way freewheel clutch 222, 222', 222" may be overrun when the rotational speed of the planetary ring gear 214 is less than the input speed.

In FIGS. 3-7, the one-way freewheel clutch 222 selectively couples one planet gear 212 to another planet gear 212. In these figures, four one-way freewheel clutches 222 are shown; however, a greater or lesser number of one-way freewheel clutches may be provided. The one-way freewheel clutch 222 may be rotatably disposed on the planet gear carrier 216. For instance, the one-way freewheel clutch 222 may be rotatable about a clutch axis 260 with respect to the planet gear carrier 216. The clutch axis 260 may extend parallel or substantially parallel to the axis 70 and may be disposed closer to the axis 70 than the planet gear axes 218 are disposed to the axis 70. A biasing member, such as a spring, may be associated with each one-way freewheel clutch 222. The biasing member may urge the one-way freewheel clutch 222 to rotate about the clutch axis 260 in a clockwise direction from the perspective shown.

Each one-way freewheel clutch 222 may be engageable with two members of the set of planet gears 212 to inhibit rotation of the planet gears 212 with respect to the planet gear carrier 216. In at least one configuration, the one-way freewheel clutch 222 may be generally shaped like a parallelogram and may have first tip 270 and a second tip 272 disposed opposite the first tip 270. The first tip 270 and the second tip 272 may be engageable with different planet gears 212 to inhibit rotation as will be discussed in more detail below.

Starting with FIG. 3, operation of the planetary gear set 200 and the one-way freewheel clutches 222 will now be described. Solid circular dots are shown on the sun gear 210, planet gears 212, and the planetary ring gear 214, to help highlight rotational movement of these components from figure to figure.

In FIG. 3, a high-speed mode is shown. The high-speed mode and rotational directions shown may be associated with a forward direction of travel of the vehicle in which the planet gear carrier 216 may be driven by the rotor 106. The sun gear 210 may be coupled to the drive pinion 84 as previously discussed. The planetary ring gear clutch 220 may be engaged to limit or prevent rotation of the planetary ring gear 214.

Figure 4:
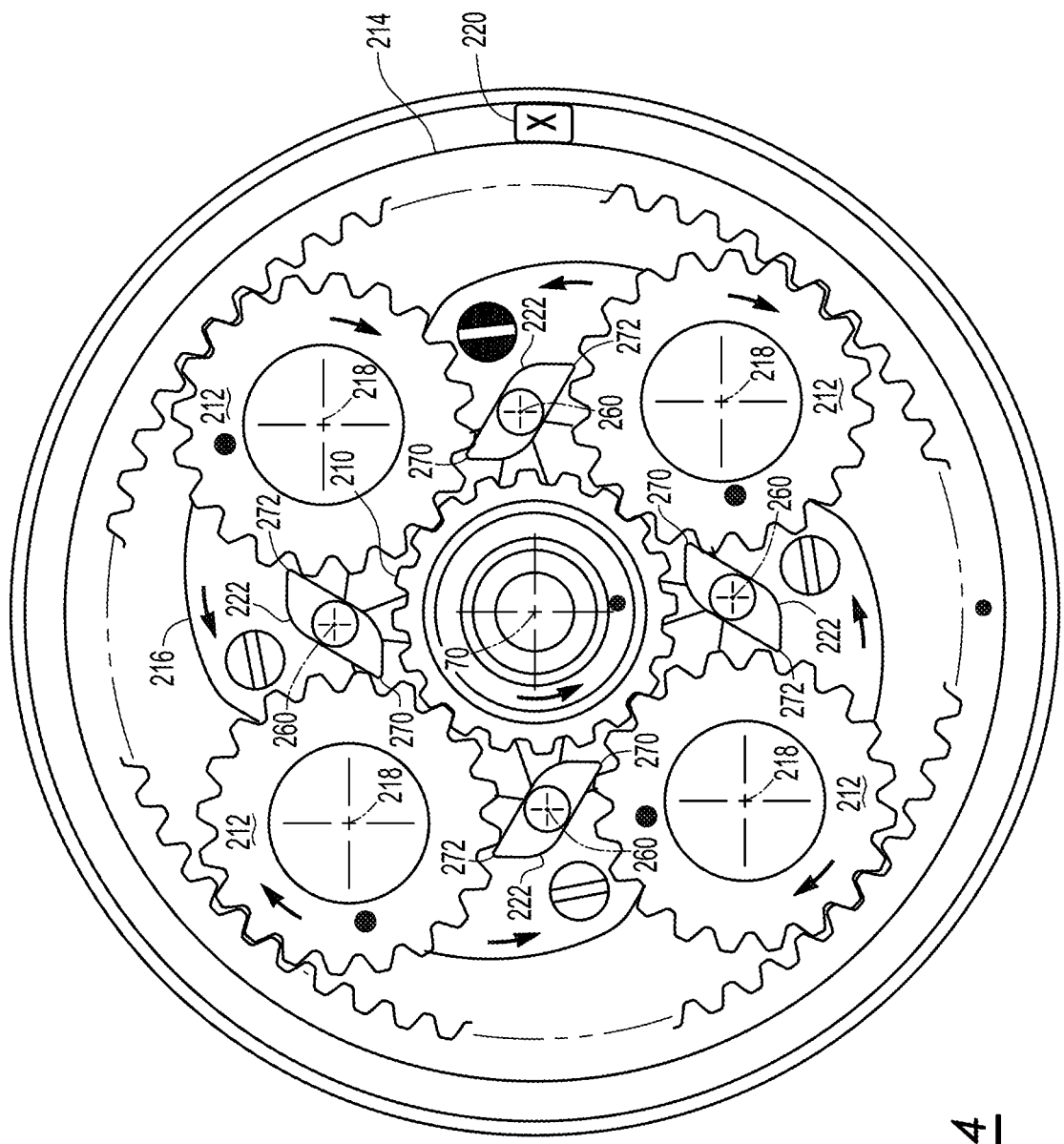

In this example and from the perspective shown, the rotor 106 may rotate the planet gear carrier 216 in a counterclockwise direction, which is best understood by comparing FIGS. 3 and 4. In response, the planet gears 212 may rotate in a clockwise direction about their respective planet gear axes 218 with respect to the planet gear carrier 216 and travel along the planetary ring gear 214. The sun gear 210 may rotate in a counterclockwise direction about the axis 70 in response. The one-way freewheel clutches 222 do not couple pairs of planet gears 212 to each other. Instead, the first and second tips 270, 272 may slide along or bounce off of the tip surfaces of the teeth of the planet gears 212 (i.e., the tip surface may be a surface of a tooth that faces away from the planet gear axis 218 and is disposed furthest from the planet gear axis 218) without preventing or stopping rotation of the planet gears 212 with respect to each other. As such, the one-way freewheel clutch 222 may permit rotation of the set of planet gears 212 with respect to the planet gear carrier 216, the sun gear 210, and the planetary ring gear 214 when the planetary ring gear 214 is inhibited from rotating about the axis 70.

Figure 5:
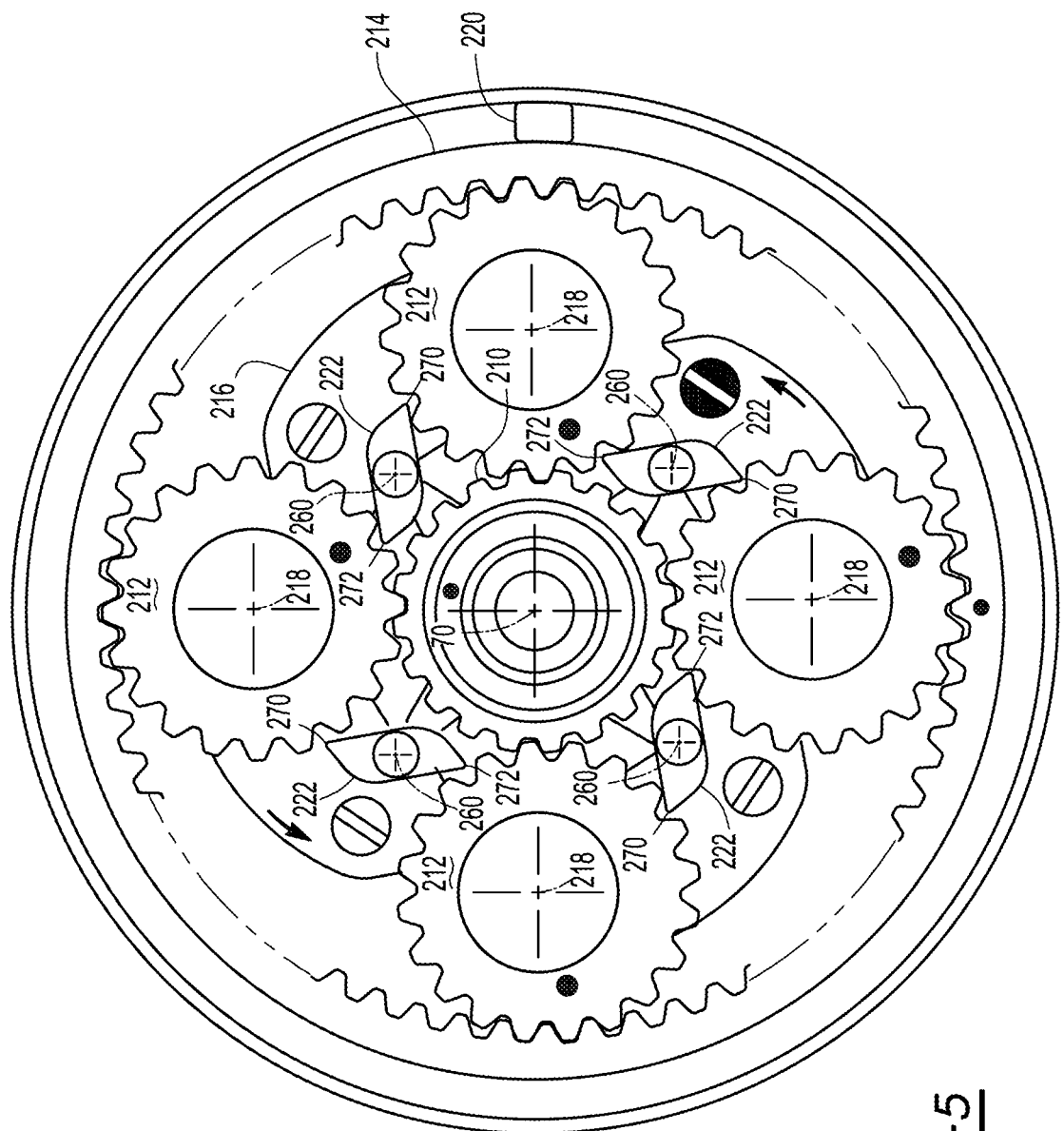
FIGS. 5-7 show a sequence of positions that depict the one-way freewheel clutches of FIGS. 3 and 4 moving to couple the planet gears to each other.
Figure 6:
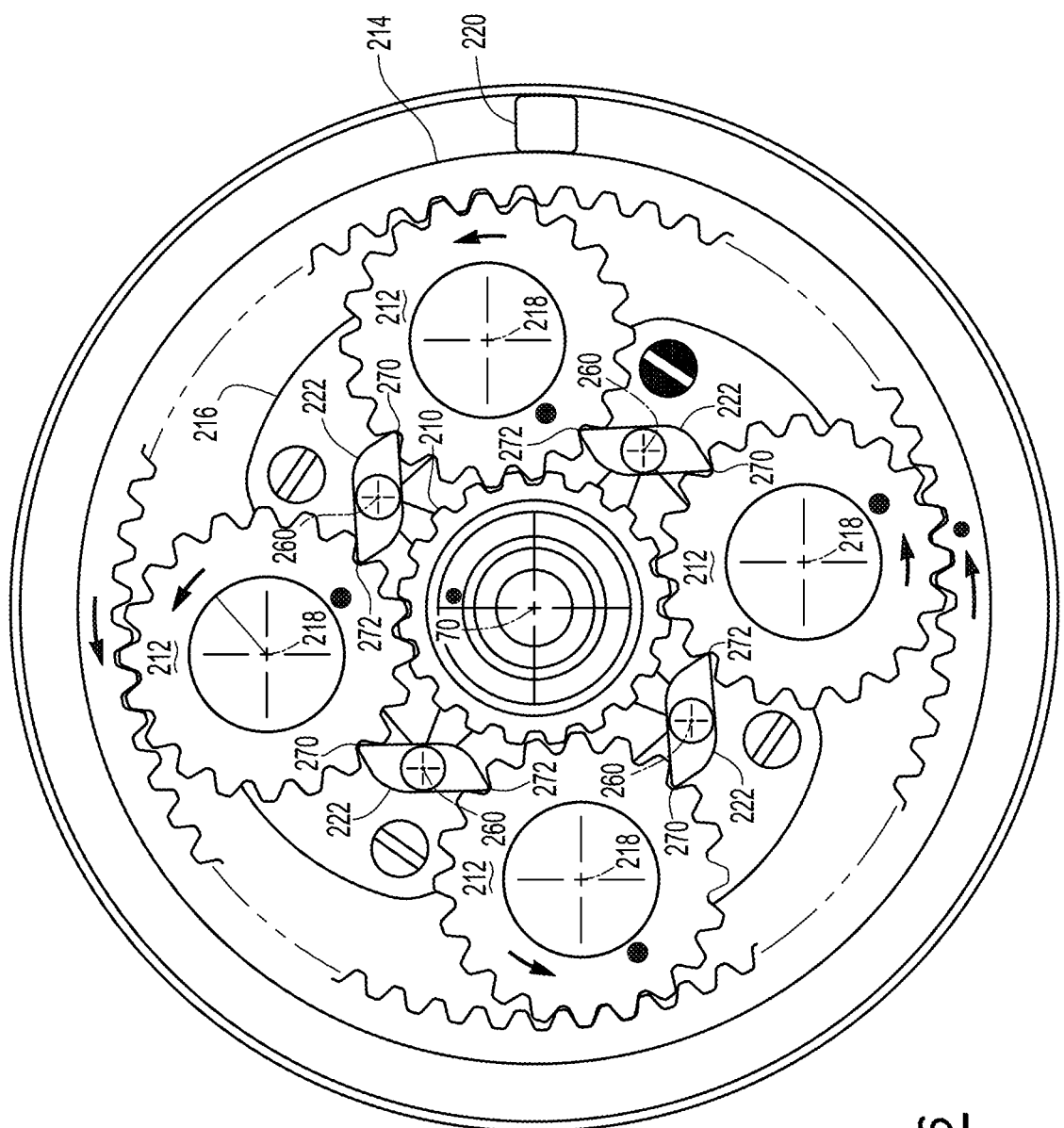
Figure 7:
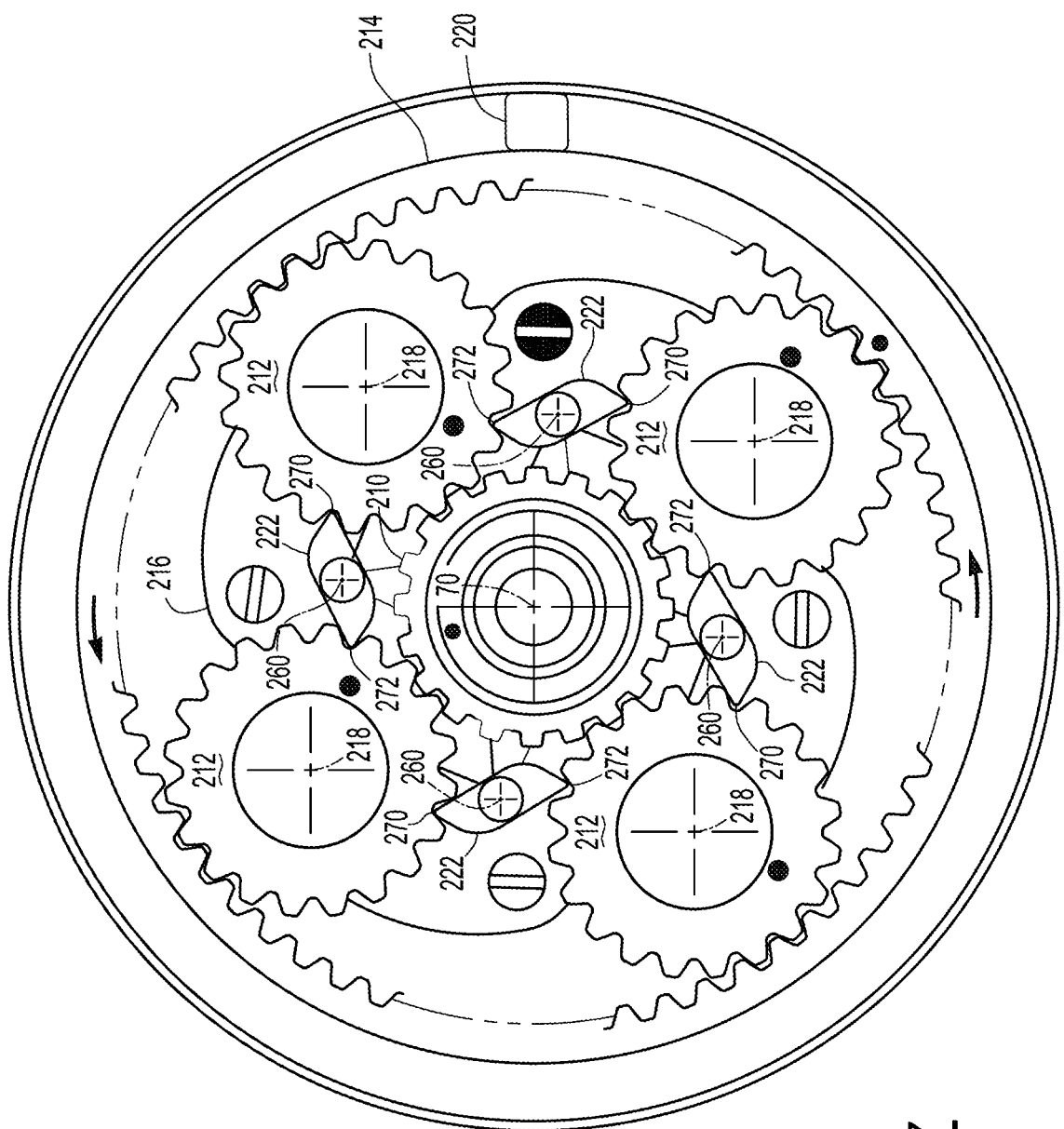

Referring to FIGS. 5-7, a low-speed mode is shown. The low-speed mode may again be associated with a forward direction of travel of the vehicle in which the planet gear carrier 216 may be driven by the rotor 106 and the sun gear 210 may be coupled to the drive pinion 84. The planetary ring gear clutch 220 may be disengaged to permit rotation of the planetary ring gear 214.

FIG. 5 illustrates the low-speed mode at startup or beginning from a stationary rest position. The planetary ring gear clutch 220 is disengaged to permit rotation of the planetary ring gear 214. The one-way freewheel clutches 222 may also be disengaged to permit rotation of the planet gears 212 with respect to the planet gear carrier 216.

As is best understood by comparing FIGS. 5 and 6, torque provided by the rotor 106 to the planet gear carrier 216 may begin to rotate the planet gear carrier 216 in a counterclockwise direction from the perspective shown. In response, the planet gears 212 may begin to rotate in a counterclockwise direction about their respective planet gear axes 218. This in turn causes the planetary ring gear 214 to begin to rotate in a counterclockwise direction about the axis 70. The sun gear 210 may remain stationary.

The one-way freewheel clutches 222 move from a disengaged position in FIG. 5 to an engaged position in FIG. 6 in which a one-way freewheel clutch 222 couples a pair of planet gears 212 to each other. The rotational distance of travel from the position shown in FIG. 5 to the position shown in FIG. 6 is short since the one-way freewheel clutch 222 does not need to rotate far to engage a pair of planet gears 212. Each one-way freewheel clutch 222 may rotate in a clockwise direction about its clutch axis 260 from the perspective shown under the biasing force exerted by the biasing member. The tips of the one-way freewheel clutch 222 may then engage corresponding planet gears 212 in a manner that stops the counterclockwise rotation of the planet gears 212 and thus stops rotation of the planet gears 212 with respect to each other. For instance, the first tip 270 of a one-way freewheel clutch 222 may contact a first member of the set of planet gears 212 and may be received between adjacent teeth of the first member of the set of planet gears 212. The second tip 272 may contact a second member of the set of planet gears 212 and may be received between teeth of the second member of the set of planet gears 212. The first and second tips 270, 272 may contact a flank of a corresponding planet gear tooth, the root surface between adjacent planet gear teeth, or combinations thereof. Two one-way freewheel clutches 222 may engage each planet gear 212 when multiple planet gears 212 are provided and the number of planet gears 212 equals the number of one-way freewheel clutches 222.

Referring to FIG. 7, the sun gear 210 and hence the drive pinion 84 may begin to rotate once the one-way freewheel clutches 222 are engaged. More specifically, the planet gear carrier 216, planet gears 212, the planetary ring gear 214, and the sun gear 210 may be rotatable together about the axis 70 (which is represented by the two arrowed lines on the planetary ring gear 214) and may not rotate with respect to each other when the one-way freewheel clutch 222 inhibits rotation of the set of planet gears 212 with respect to the planet gear carrier 216. As a result, a 1:1 gear ratio may be provided between the rotor 106 and the drive pinion 84.

Figure 8:
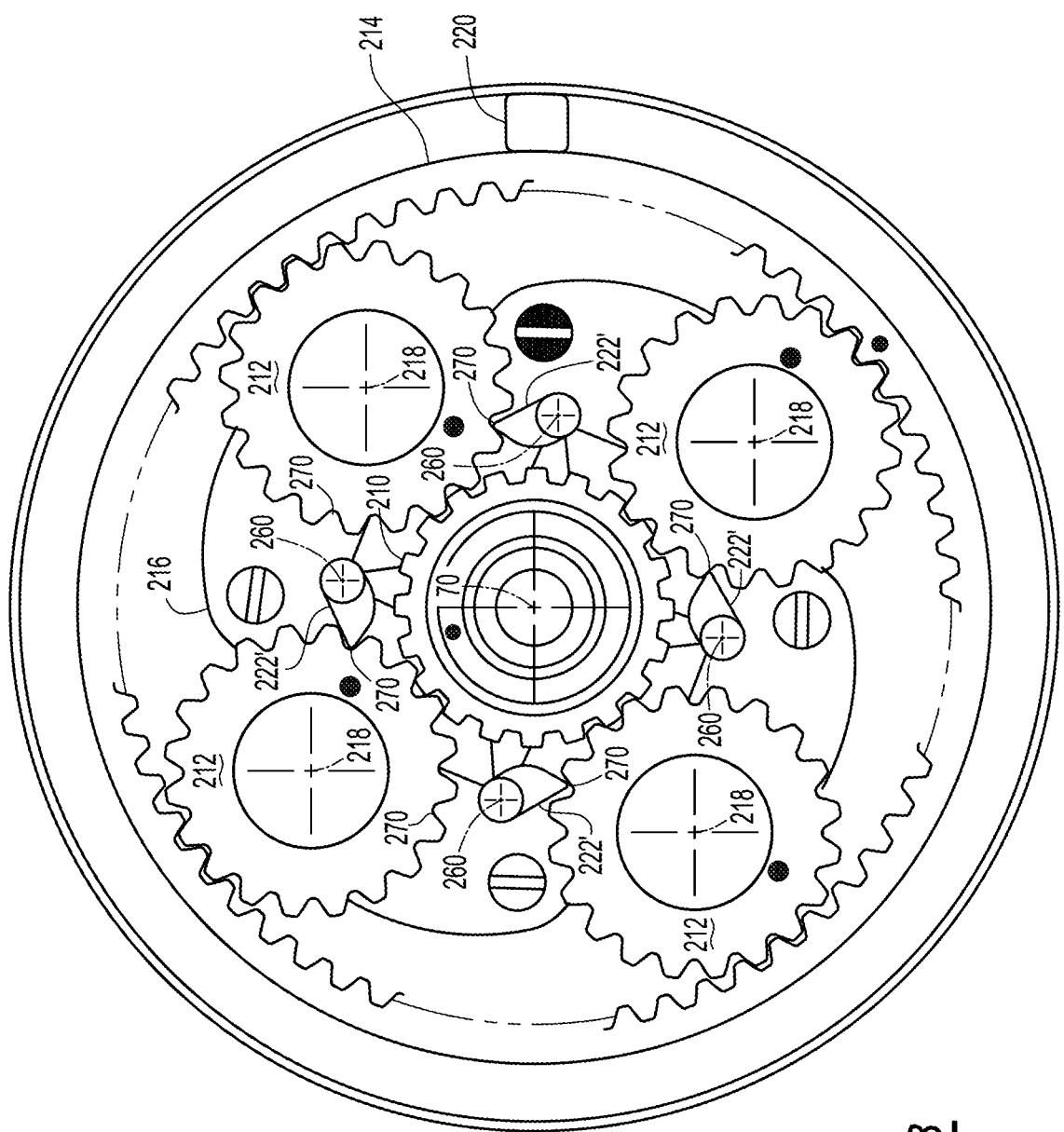
FIG. 8 is an example of a planetary gear set with one-way freewheel clutches that selectively couple a planet gear to a planet gear carrier.

Referring to FIG. 8, another configuration is shown in which the one-way freewheel clutch 222' selectively couples a planet gear 212 to the planet gear carrier 216. This configuration may have the same structure as that shown in FIGS. 3-7 except for the configuration of the one-way freewheel clutch 222'. Each one-way freewheel clutch 222' may have a first tip 270 but not a second tip 272. As such, each one-way freewheel clutch 222' may be engageable with one member of the set of planet gears 212. More specifically, the one-way freewheel clutch 222' may permit rotation of a corresponding planet gear 212 in the high-speed mode in which the planetary ring gear clutch 220 is engaged as in FIGS. 3 and 4 as previously discussed and may rotate to inhibit rotation of a corresponding planet gear 212 with respect to the planet gear carrier 216 in the low-speed mode in which the planetary ring gear clutch 220 is disengaged and the first tip 270 one-way freewheel clutch 222' is received between teeth of an associated planet gear 212 similar to FIGS. 5-7 as previously discussed.

Referring to FIGS. 13 through 16, configurations are shown in which the one-way freewheel clutch 222" selectively couples the sun gear 210 to the planet gear carrier 216. In these configurations, the planet gear carrier 216 may be operatively connected to the rotor 106, such as via the rotor output flange 150, and the sun gear 210 may be coupled to the drive pinion 84 as previously discussed. In addition, the one-way freewheel clutch 222" extends between the sun gear 210 and the planet gear carrier 216.

In these figures, examples of torque transmission paths between the electric motor module 26 and drive pinion 84 are represented by the straight arrowed lines. For simplicity, torque transmission paths are illustrated above the axis 70; however, an analogous torque transmission may be provided below the axis 70. Torque transmission paths are primarily described in the context of transmitting torque from the electric motor module 26 to the drive pinion 84; however, the torque transmission paths may be bidirectional and may facilitate the transmission of torque from the drive pinion 84 to the electric motor module 26 under various operating conditions, such as during regenerative braking.

Figure 14:
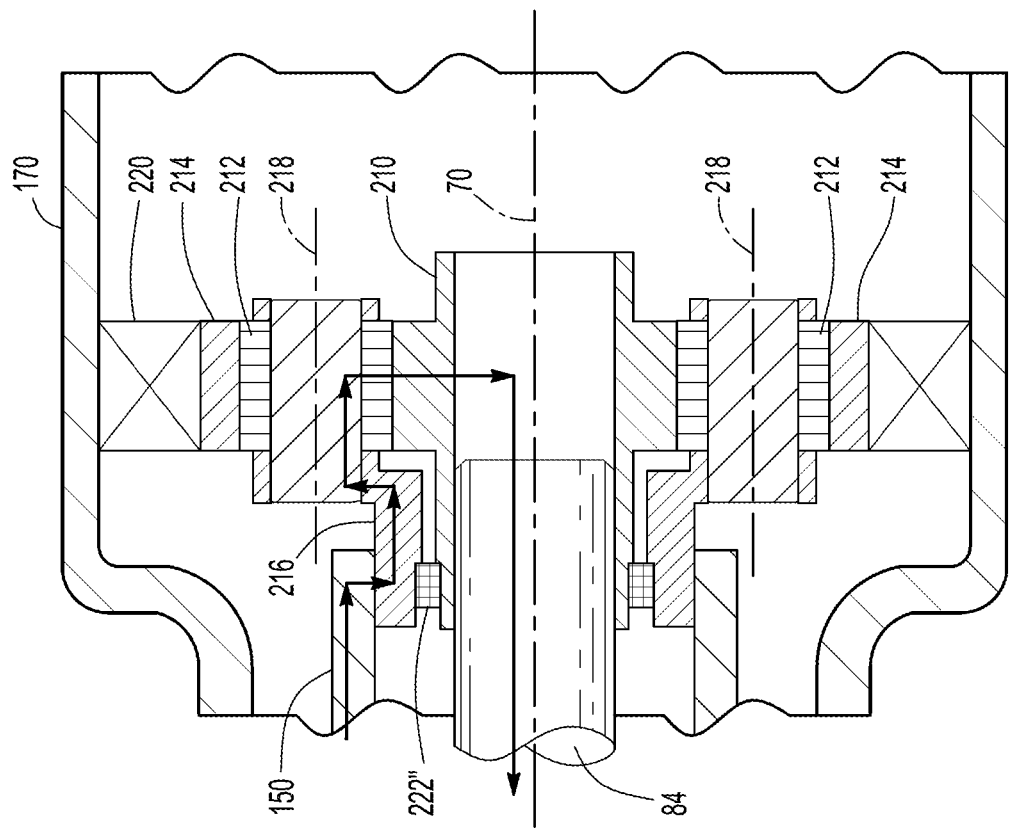
FIGS. 13 and 14 show a planetary gear set with a one-way freewheel clutch inside a planet gear carrier and associated torque transmission paths.
Figure 13:
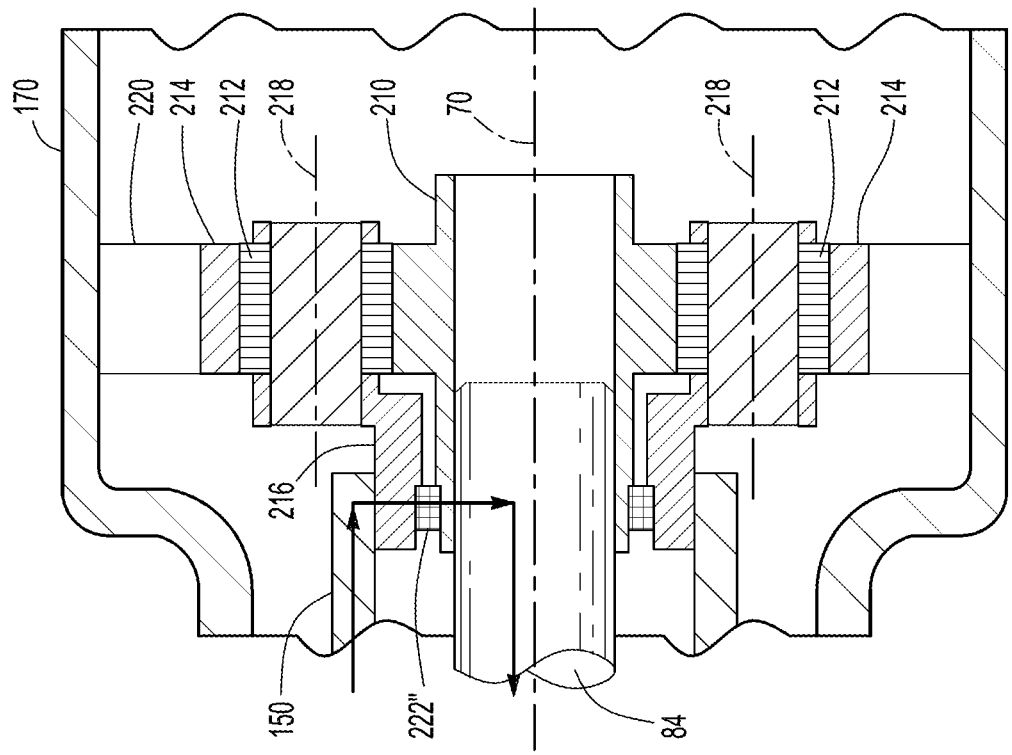

Referring to FIGS. 13 and 14, the one-way freewheel clutch 222" is received inside the planet gear carrier 216 and the sun gear 210 is received inside the one-way freewheel clutch 222". As such, the one-way freewheel clutch 222" may encircle the axis 70 and the sun gear 210 while the planet gear carrier 216 may encircle the one-way freewheel clutch 222". The one-way freewheel clutch 222" may extend from the sun gear 210 to the planet gear carrier 216. Although only one one-way freewheel clutch 222" is shown, it is contemplated that multiple one-way freewheel clutches 222" may be provided.

In FIG. 13, a low-speed mode is shown. In the low-speed mode, the planetary ring gear clutch 220 may be disengaged so that the planetary ring gear 214 is free to rotate about the axis 70. Torque may be transmitted between the planet gear carrier 216 and sun gear 210 via the one-way freewheel clutch 222". For instance, torque may be transmitted from the rotor 106 to the planet gear carrier 216, such as rotor output flange 150, and from the planet gear carrier 216 to the sun gear 210 and the drive pinion 84 via the one-way freewheel clutch 222".

In FIG. 14, a high-speed mode is shown. In the high-speed mode, the planetary ring gear clutch 220 may be engaged so that rotation of the planetary ring gear 214 about the axis 70 may be slowed or inhibited. Torque may be transmitted between the planet gear carrier 216 and the sun gear 210 via the set of planet gears 212 rather than via the one-way freewheel clutch 222". As such, the one-way freewheel clutch 222" may be overrun and may permit the sun gear 210 to rotate faster than the planet gear carrier 216 in the high-speed mode.

Figure 16:
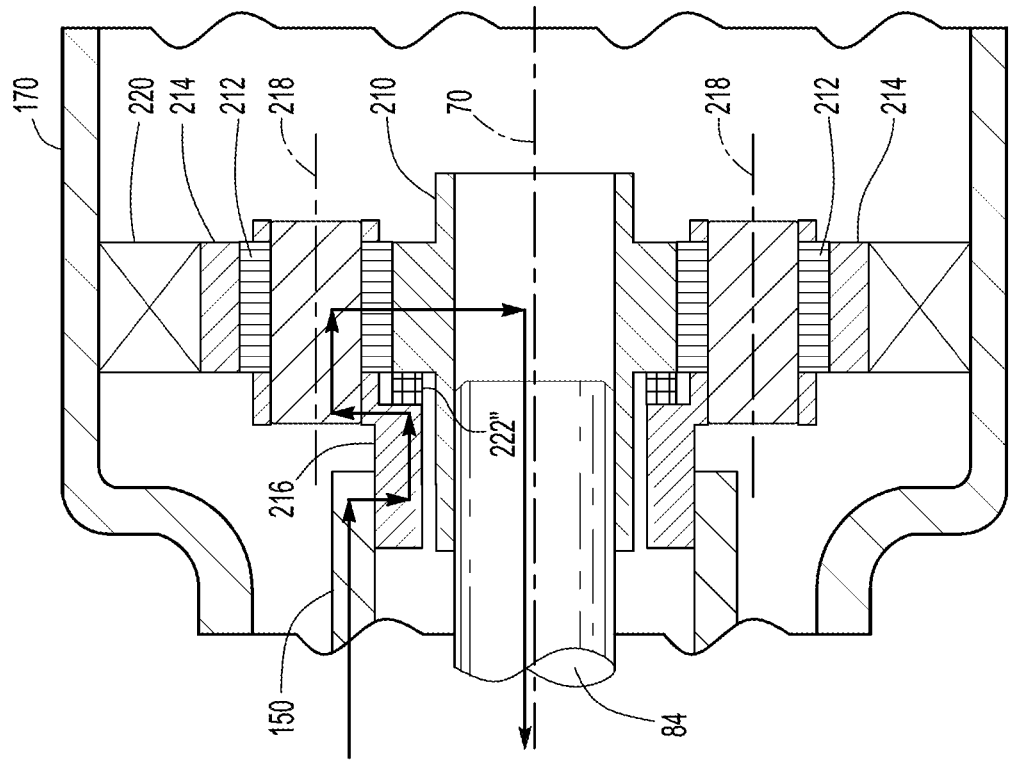
FIGS. 15 and 16 show a planetary gear set with a one-way freewheel clutch axially positioned between a sun gear and a planet gear carrier and associated torque transmission paths.
Figure 15:
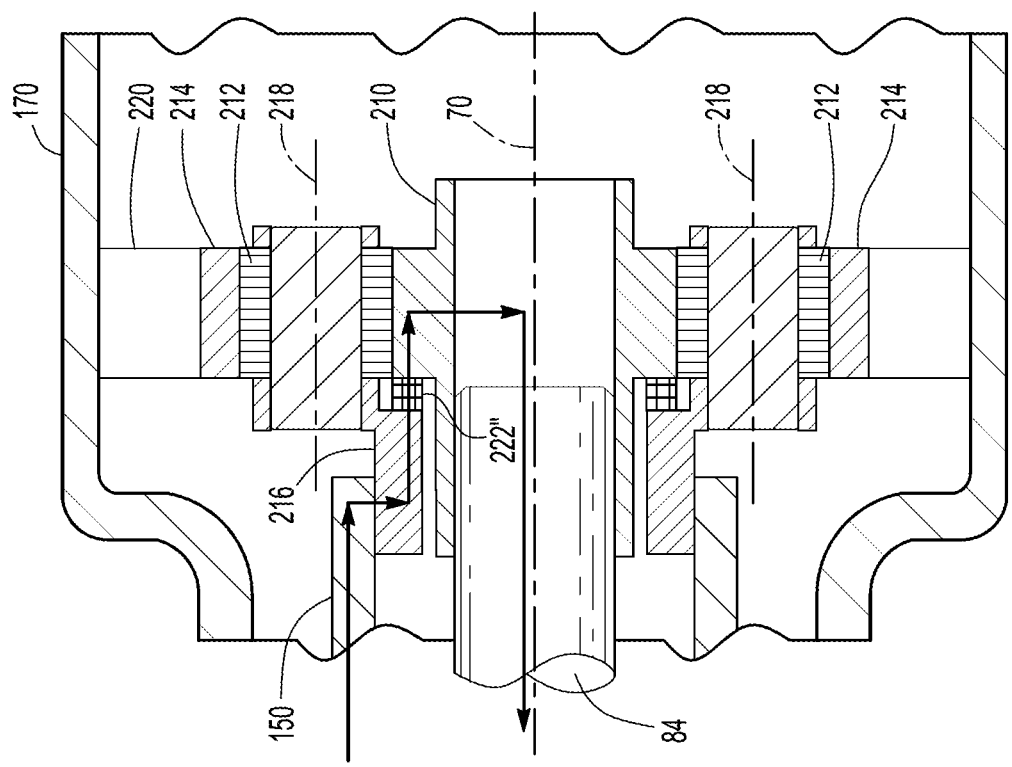

Referring to FIGS. 15 and 16, another configuration is shown in which the one-way freewheel clutch 222" is positioned along the axis 70 between the sun gear 210 and the planet gear carrier 216. As such, the one-way freewheel clutch 222" may extend axially or in a direction that extends parallel to the axis 70 from the sun gear 210 to the planet gear carrier 216. Like the configuration in FIGS. 13 and 14, the one-way freewheel clutch 222" may be received inside the planet gear carrier 216. Optionally, the sun gear 210 is received inside the one-way freewheel clutch 222", in which case the one-way freewheel clutch 222" may encircle the axis 70 and the sun gear 210 while the planet gear carrier 216 may encircle the one-way freewheel clutch 222". This configuration may provide reduced power loss when the one-way freewheel clutch 222" is overrun as compared to the configuration shown in FIGS. 13 and 14.

In FIG. 15, a low-speed mode is shown. In the low-speed mode, the planetary ring gear clutch 220 may be disengaged so that the planetary ring gear 214 is free to rotate about the axis 70. Torque may be transmitted between the planet gear carrier 216 and sun gear 210 via the one-way freewheel clutch 222". For instance, torque may be transmitted from the rotor 106 to the planet gear carrier 216, such as rotor output flange 150, and from the planet gear carrier 216 to the sun gear 210 and the drive pinion 84 via the one-way freewheel clutch 222".

In FIG. 16, a high-speed mode is shown. In the high-speed mode, the planetary ring gear clutch 220 may be engaged so that rotation of the planetary ring gear 214 about the axis 70 may be slowed or inhibited. Torque may be transmitted between the planet gear carrier 216 and the sun gear 210 via the set of planet gears 212 rather than via the one-way freewheel clutch 222". As such, the one-way freewheel clutch 222" may be overrun and may permit the sun gear 210 to rotate faster than the planet gear carrier 216 in the high-speed mode.

The configurations described above allow an axle assembly to be provided with multiple operating speeds or multiple gear ratios without the use of a shift collar to engage a desired gear ratio. More specifically, changes between operating speeds or gear ratios may be executed without the use of a shift collar that may be rotatable with a drive pinion and that is selectively engageable with different components of a planetary gear set. Eliminating a shift collar allows more rapid engagement of a desired operating speed as the rotational speed of the electric motor does not need to be manipulated to sufficiently synchronize the rotational speed of a component of the planetary gear set with the rotational speed of the drive pinion to execute a shift collar shift from one position to another. Eliminating the shift collar may also help reduce weight, complexity, and package space requirements. The present invention also allows the rotational speed of the planetary ring gear to be smoothly controlled such that there is a continuous change to the effective overall gear ratio that not only allows for rapid mode changes, but also reduces the perceived harshness of a mode change. Control algorithms may be significantly simplified as gear ratio changes are accomplished primarily by controlling the rotational speed of the planetary ring gear rather than by the rotational speeds of multiple components and a shift collar actuator. During torque reversal events such as during regenerative braking, the rotational speed of the planetary ring gear may be controlled to reduce or eliminate free-wheeling motion so to improve the regenerative braking efficacy.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An axle assembly comprising:
    an electric motor module having a rotor that is rotatable about an axis;
    a drive pinion that is rotatable about the axis;
    a planetary gear set that operatively connects the rotor to the drive pinion, the planetary gear set including:
        a planet gear carrier that is rotatable about the axis and that is operatively connected to the rotor;
        a sun gear that is rotatable about the axis and that is operatively connected to the drive pinion;
        a planetary ring gear that encircles the sun gear and is rotatable about the axis; and
        a set of planet gears that is rotatably supported upon the planet gear carrier, wherein each member of the set of planet gears meshes with the sun gear and the planetary ring gear; and
    a one-way freewheel clutch that is rotatably disposed on the planet gear carrier and is engageable with at least one member of the set of planet gears.

2. The axle assembly of claim 1 wherein each member of the set of planet gears is rotatable about a planet gear axis with respect to the planet gear carrier, the one-way freewheel clutch is rotatable about a clutch axis with respect to the planet gear carrier, and the clutch axis is disposed closer to the axis than the planet gear axes are disposed to the axis.

3. The axle assembly of claim 1 wherein the one-way freewheel clutch is engageable with one member of the set of planet gears.

4. The axle assembly of claim 3 wherein the one-way freewheel clutch inhibits rotation of a first member of the set of planet gears with respect to the planet gear carrier when the one-way freewheel clutch is received between teeth of the first member of the set of planet gears.

5. The axle assembly of claim 1 wherein the one-way freewheel clutch is engageable with two members of the set of planet gears.

6. The axle assembly of claim 5 wherein the one-way freewheel clutch inhibits rotation of the set of planet gears with respect to the planet gear carrier when the one-way freewheel clutch is received between teeth of a first member of the set of planet gears and is received between teeth of a second member of the set of planet gears and the planetary ring gear is rotatable about the axis.

7. The axle assembly of claim 5 wherein the one-way freewheel clutch inhibits rotation of the set of planet gears with respect to the planet gear carrier when a first tip of the one-way freewheel clutch contacts a first member of the of the set of planet gears and is received between adjacent teeth of the first member of the set of planet gears and a second tip of the one-way freewheel clutch contacts a second member of the set of planet gears and is received between teeth of the second member of the set of planet gears.

8. The axle assembly of claim 5 wherein the planetary ring gear, the planet gear carrier, and the sun gear are rotatable together about the axis when the one-way freewheel clutch inhibits rotation of the set of planet gears with respect to the planet gear carrier.

9. The axle assembly of claim 5 wherein the one-way freewheel clutch permits rotation of the set of planet gears with respect to the planet gear carrier when the planetary ring gear is inhibited from rotating about the axis.

10. The axle assembly of claim 9 wherein the one-way freewheel clutch permits rotation of the set of planet gears with respect to the sun gear and the planetary ring gear when the planetary ring gear is inhibited from rotating about the axis.

11. The axle assembly of claim 1 wherein a planetary ring gear clutch controls rotation of the planetary ring gear about the axis.

12. The axle assembly of claim 11 wherein the planetary ring gear clutch is a band clutch that partially encircles the planetary ring gear.

13. The axle assembly of claim 11 wherein the planetary ring gear clutch is a multi-plate clutch that encircles the planetary ring gear and that is actuatable in a direction that extends along the axis.

14. An axle assembly comprising:
  an electric motor module having a rotor that is rotatable about an axis;
  a drive pinion that is rotatable about the axis;
  a planetary gear set that operatively connects the rotor to the drive pinion, the planetary gear set including:
    a planet gear carrier that is rotatable about the axis and that is operatively connected to the rotor;
    a sun gear that is rotatable about the axis and that is operatively connected to the drive pinion;
    a planetary ring gear that encircles the sun gear and is rotatable about the axis; and
    a set of planet gears that is rotatably supported upon the planet gear carrier, wherein each member of the set of planet gears meshes with the sun gear and the planetary ring gear; and
  a one-way freewheel clutch that extends between the sun gear and the planet gear carrier.

15. The axle assembly of claim 14 wherein the one-way freewheel clutch encircles the axis and the planet gear carrier encircles the one-way freewheel clutch.

16. The axle assembly of claim 15 wherein the one-way freewheel clutch encircles the sun gear and extends from the sun gear to the planet gear carrier.

17. The axle assembly of claim 14 wherein the one-way freewheel clutch is positioned along the axis between the sun gear and the planet gear carrier.

18. The axle assembly of claim 17 wherein the one-way freewheel clutch extends axially from the sun gear to the planet gear carrier.

19. The axle assembly of claim 14 wherein torque is transmitted from the planet gear carrier to the sun gear via the one-way freewheel clutch in a low-speed mode in which the planetary ring gear is free to rotate about the axis.

20. The axle assembly of claim 14 wherein torque is transmitted from the planet gear carrier to the sun gear via the set of planet gears and the one-way freewheel clutch permits the sun gear to rotate faster than the planet gear carrier in a high-speed mode when the planetary ring gear is inhibited from rotating about the axis.

* * * * *

UNITED STATES PATENT AND TRADEMARK OFFICE
CERTIFICATE OF CORRECTION

PATENT NO. : 11,364,797 B1
APPLICATION NO. : 17/342818
DATED : June 21, 2022
INVENTOR(S) : Brian D. Hayes et al.

Page 1 of 1

It is certified that error appears in the above-identified patent and that said Letters Patent is hereby corrected as shown below:

In the Claims

Column 13, Lines 19-20, Claim 7:
After "clutch contacts a first member of the"
Delete "of the" (second occurrence)

Signed and Sealed this
Eighteenth Day of April, 2023

Katherine Kelly Vidal
*Director of the United States Patent and Trademark Office*